(12) United States Patent
Pettersson

(10) Patent No.: US 7,627,956 B2
(45) Date of Patent: Dec. 8, 2009

(54) MEASUREMENT PROBE FOR USE IN COORDINATE MEASURING MACHINES

(75) Inventor: Bo Pettersson, London (GB)

(73) Assignee: Hexagon Metrology AB, Nacka Strand (SE)

( * ) Notice: Subject to any disclaimer, the term of this patent is extended or adjusted under 35 U.S.C. 154(b) by 327 days.

(21) Appl. No.: 11/630,671

(22) PCT Filed: Jun. 20, 2005

(86) PCT No.: PCT/SE2005/000958

§ 371 (c)(1),
(2), (4) Date: May 3, 2007

(87) PCT Pub. No.: WO2006/001757

PCT Pub. Date: Jan. 5, 2006

(65) Prior Publication Data

US 2008/0282564 A1    Nov. 20, 2008

(30) Foreign Application Priority Data

Jun. 28, 2004    (SE) .................................... 0401660

(51) Int. Cl.
G01B 7/012    (2006.01)
G01B 5/012    (2006.01)
(52) U.S. Cl. .......................................... 33/503; 33/556
(58) Field of Classification Search ............... 33/559, 33/560, 561, 556, 557, 558, 503
See application file for complete search history.

(56) References Cited

U.S. PATENT DOCUMENTS 5,333,514 A * 8/1994 Toyama et al. ........... 74/490.06
5,715,729 A    2/1998 Toyama et al.
5,743,020 A    4/1998 Sheldon
5,836,082 A * 11/1998 Sheldon ........................ 33/556
6,145,405 A * 11/2000 McMurtry et al. ....... 74/490.07
6,336,375 B1   1/2002 McMurtry et al.
6,397,485 B1 * 6/2002 McMurtry .................... 33/503
6,497,548 B1 * 12/2002 Roy et al. .................... 414/735
6,516,681 B1 * 2/2003 Pierrot et al. ............. 74/490.01
7,040,033 B2 * 5/2006 Zhu et al. ..................... 33/502
7,386,408 B2 * 6/2008 Nishibashi et al. ........... 702/94
7,500,319 B2 * 3/2009 Pettersson ..................... 33/559

FOREIGN PATENT DOCUMENTS

| EP | 1336815 | A2 | * | 8/2003 |
| GB | 1551218 | | | 8/1979 |
| GB | 2454805 | A | * | 5/2009 |
| JP | 07148679 | A | * | 6/1995 |
| JP | 10213403 | A | * | 8/1998 |
| JP | 2004276203 | A | * | 10/2004 |

* cited by examiner

Primary Examiner—R. A. Smith
(74) Attorney, Agent, or Firm—Young & Thompson

(57) ABSTRACT

A measurement probe for use in coordinate measuring machines, which measurement probe includes a base (1) connected with a coordinate measuring machine, a measurement tip (4) and a ball (5) arranged at the first end of the measurement tip (4). The measurement tip (4) is supported at its other end with the aid of at least three rigid supports (2) supported by the base (1), whereby the supports (2) are connected with the measurement tip by way of spherical connections and where the supports (2) can be displaced along their longitudinal directions relative to the base (1).

6 Claims, 3 Drawing Sheets

MEASUREMENT PROBE FOR USE IN COORDINATE MEASURING MACHINES

Figure 1:
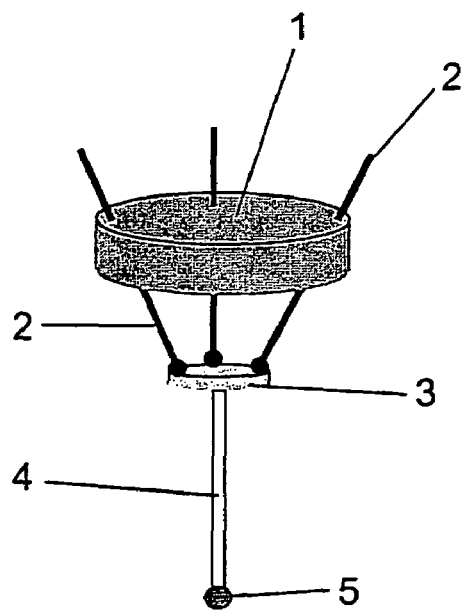

The present invention relates to a measurement probe for use in coordinate measuring machines.

Measurement probes are used in coordinate measuring machines as the device that is intended to make contact with the measurement object that is to be measured, and the device is arranged on the end of a mobile arm such that it produces a signal when brought into contact with the measurement object, which gives rise to the registration of the position of the probe in a coordinate system. Alternatively, an optical device, i.e. a contact-free device, may be used, in order to produce the above-mentioned signal when placed in an exact position relative to the measurement object.

The probe comprises a measurement tip, that demonstrates a free end where a ball is normally arranged for contact with the measurement object. The measurement tip is so mounted in the probe that the contact of the ball with the measurement object gives a displacement of the mounting of the measurement tip, the size and direction of which displacement can be determined, such that the exact point of contact between the ball and the measurement object can be determined.

In existing coordinate measuring machines comprising such measurement probes the mounting of the measurement tip is normally constructed such that a number of elements are connected in sequence, and it is possible to bend these elements only in one direction that is perpendicular to the elements in order together to give the measurement tip the possibility to be displaced somewhat in a freely defined direction. The displacement is detected in order to prevent further displacement of the probe, and its current position and, where required, the displacement of the measurement tip are recorded in order to calculate the current position of the measurement object. An example of such a measurement probe can be found in the patent document GB 1551218.

One problem with the above-described type of measurement probe is that the errors that they record are accumulated and in this way give rise to serial errors.

It is therefore a purpose of the present invention to achieve a new measurement probe that gives the possibility of more exact measurements, and where the above-described type of source of error can be removed.

The above-mentioned purpose is achieved with a measurement probe according to the invention where the probe comprises a base connected to a coordinate measuring machine, a measurement tip holder and a measurement tip that is supported by this holder, where the measurement tip holder is supported by the base with the aid of at least three rigid supports, whereby the supports are connected to the measurement tip holder by means of spherical connections and where the supports can be displaced along their longitudinal directions relative to the base such that the angle between the measurement tip holder and the base can be altered, and where the supports are connected to the base by means of leaf springs directed in a radial direction out from the base.

The supports are arranged in one embodiment such that they can be displaced along their longitudinal directions and they are provided with driving means such that the measurement tip holder, and thus the measurement tip with its ball, can be adjusted by means of self-displacement.

The measurement tip comprises according to one embodiment a physical measurement tip with a ball arranged at the end of it.

The measurement tip is constituted according to a second embodiment by a virtual tip, with an optical sensor arranged to detect the proximity of the virtual tip to a measurement object. Such an optical sensor may be, for example, a laser, a CCD camera, or similar.

More generally, the invention involves the connection of six supports between the base and the measurement tip holder, and the possibility that these supports can be individually displaced relative to the base. The measurement tip holder in this case is designed in such a manner that each support, or combination of supports, controls the six degrees of freedom that are available for the measurement tip holder (x, y, z, $\phi$, $\theta$, $\eta$). The invention will, however, here be described in a number of simplified, but not limiting, designs.

Figure 2:
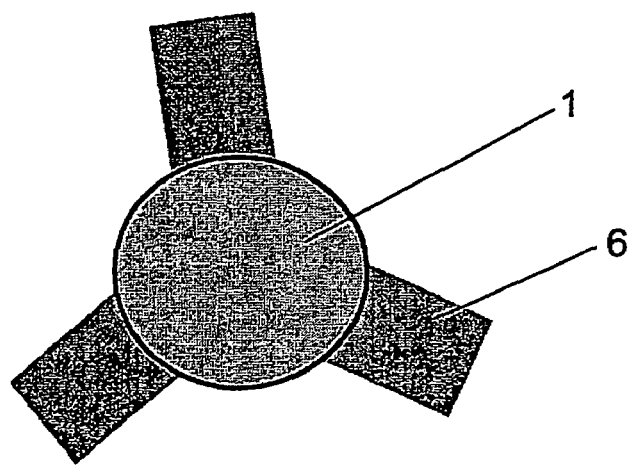
Figure 3:
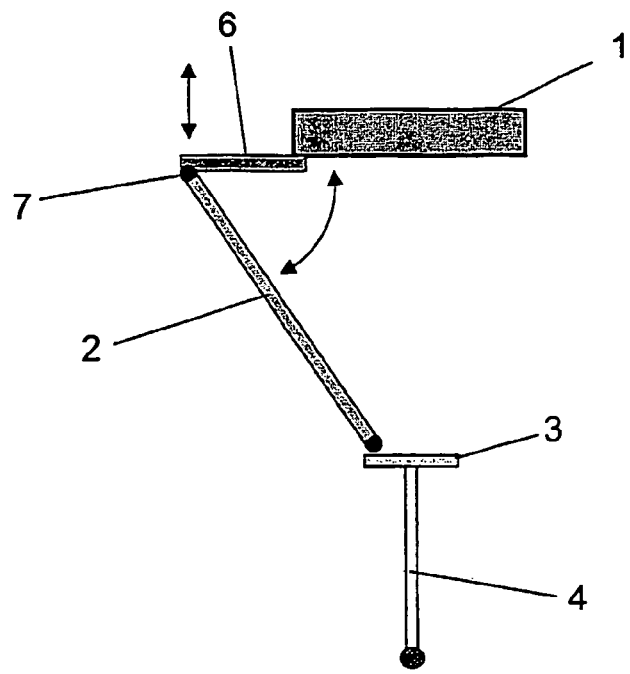
Figure 4:
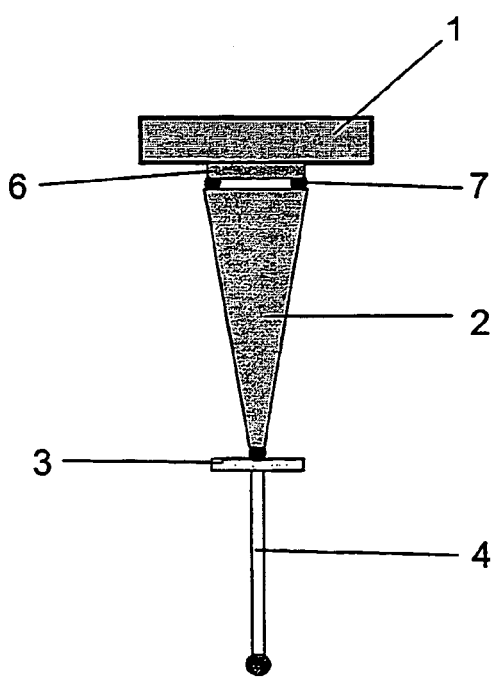
Figure 5:
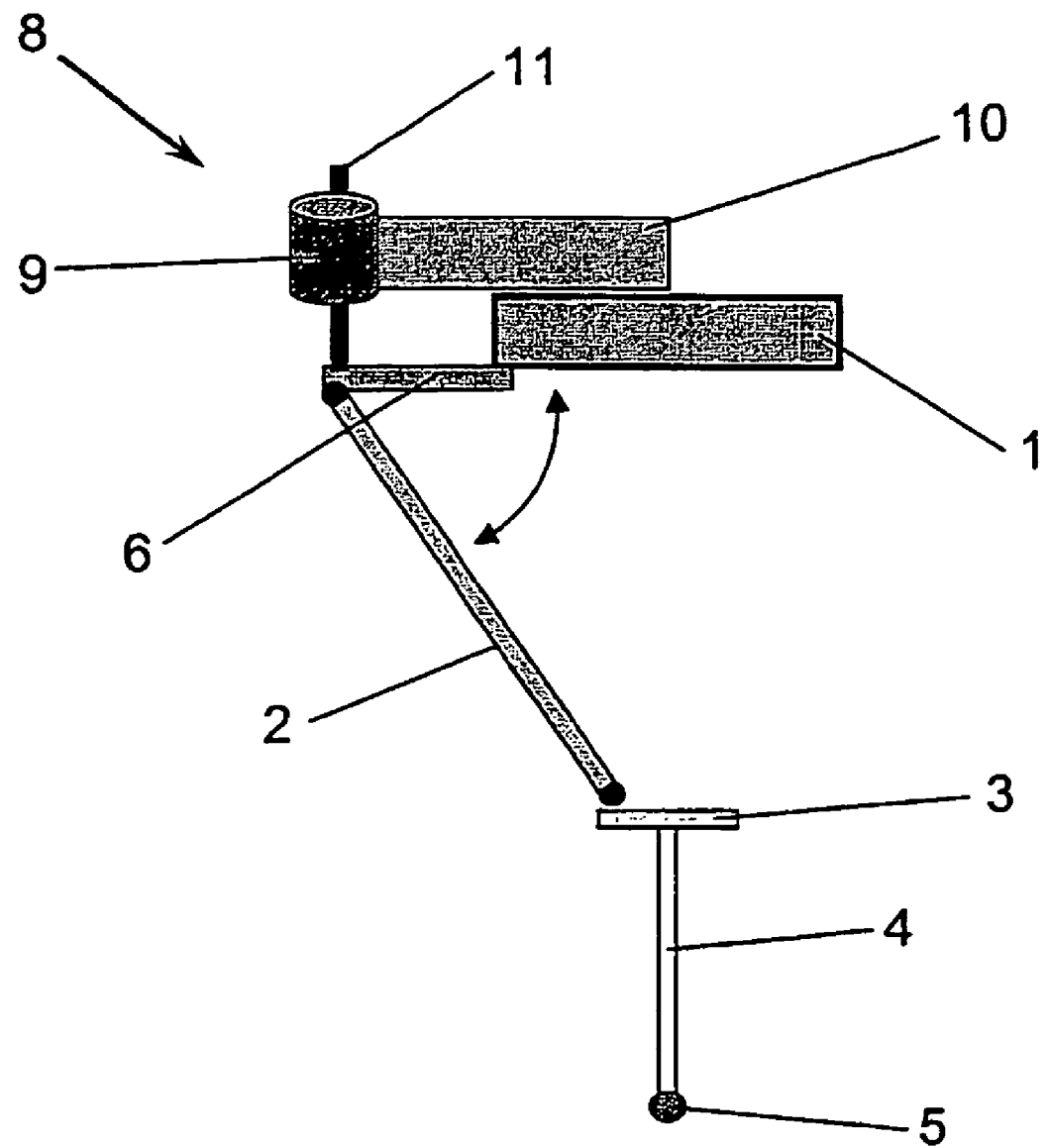

The invention will now be described in more detail in the form of a pair of embodiments, illustrated by the attached drawings, where FIG. 1 shows a general view of a measurement probe in perspective, FIG. 2 shows a view from above showing the base and the leaf springs attached to this, which springs in turn support supports for the measurement probe, FIG. 3 shows a side view of the base and one of the leaf springs in FIG. 2 with its associated support, measurement tip holder, measurement tip and ball, FIG. 4 shows a side view equivalent to that shown in FIG. 3, and FIG. 5 shows a side view of the base with a support that supports a leaf spring, measurement tip holder, measurement tip and ball, and where a driving means is arranged to interact with and control the measurement tip holder, and in this way the measurement tip and its ball.

Thus, FIG. 1 shows schematically a measurement probe comprising a base 1, three supports 2 (here having the form of three rods), which supports support a measurement tip holder 3 with the aid of spherical joints.

The number of degrees of freedom has been reduced to three (z, $\phi$, $\theta$) in this case with three supports in that each support locks two degrees of freedom as defined by the attachment to the leaf spring, shown in FIGS. 2 and 3. This means, thus, that the supports can only be displaced in the vertical direction relative to the base (z), and that the radial angle between the base and the support ($\phi$) can be changed.

The measurement tip holder 3 supports in turn a measurement tip 4 that is equipped at its free end with a ball 5, which is the element of the measurement probe that it is intended that it should be possible to bring into contact with a measurement object. Due to the spherical joints, which may consist of, for example, a ball arranged at the end of the rod 2, which ball is mounted in an internally spherical housing on the measurement tip holder 3, the rods 2 can freely adopt any angle relative to the measurement tip holder 3.

A measuring system is connected to measure the position of the measurement tip holder, and thus the position of the ball, relative to a reference point on, for example, the base 1, in order to determine the position of the ball of the probe when it is in contact with a measurement object. The measuring system, however, is not critical in itself for the invention; it may be chosen by one skilled in the arts in this technical area.

FIG. 2 shows a view from above of the base 1 to which the supports that support the measurement tip holder, the measurement tip and the ball of the measurement probe according to the invention, are connected. The supports in this case are connected to the base 1 with the aid of leaf springs 6, which are directed radially outwards from the base 1. The leaf springs 6 are rigid in the plane in which they are located, while they are flexible in the direction that lies perpendicular to this plane. The leaf springs 6 are rigidly attached to the base 1, and are connected to the supports 2 at their radially outermost ends, one support 2 being connected to one leaf spring 6. The supports 2 are, as FIG. 3 makes clear, directed passing in a direction obliquely upwards and outwards, from the connection with the measurement tip holder 3 to the connection with the leaf spring 6. It is appropriate that the connection between the leaf spring 6 and the support 2 is made with the aid of spherical joints 7, as is the connection between the support 2 and the measurement tip holder 3. FIG. 4 shows the support 2 from the front, and it is clear that it is appropriate that the support 2 is so designed such that it has a certain extent in a sideways direction such that it forms what is principally a triangular element. Its stability is in this way increased in order to prevent it twisting. The support 2 is mainly to transfer forces along its longitudinal direction, i.e. from the attachment point at the measurement tip holder 3 to the attachment points at the leaf spring 6.

A further embodiment is shown in FIG. 5 that is essentially based on the embodiments as specified by FIGS. 2-4, but where a driving means 8 is arranged such that it can displace the supports in order in this way to displace the measurement tip holder of the measurement probe and thus its measurement tip 4 and ball 5 such that the ball 5 can be brought into contact with a measurement object. It is appropriate that the driving means 8 comprises a coil 9, attached to the upper side of the base 1 with the aid of a rigid arm 10. The coil 9 surrounds a magnet 11 or another rod-shaped element of magnetic material, which magnet 11 or another rod-shaped element can move upwards and downwards above the outermost end of the leaf spring 6, such that it is possible by the supply of current to the coil 9 to press the leaf spring 6 downwards at its outermost end with the aid of the magnet 11, such that the outermost end can in turn interact with the measurement tip holder 3, and thus the measurement tip 4 and the ball 5, causing them to move such that the ball can be brought into contact with the measurement object. It is thus possible to make fine adjustments of the position of the ball 5 with the aid of the driving means 8, for an exact measurement of a measurement object. The drive arrangement 8 thus functions in the same manner as a loudspeaker element, and is in this way very easy to manoeuvre.

An optical measuring system, for example, may be used to measure the position of the measurement tip holder 3, which system measures the distance from a starting point at the base 1. Such a measurement may, for example, take place between the base and a number of fixed points on the measurement tip holder 3. The distances between these fixed points on the measurement tip holder 3 and the ball 5 are always the same, since no deformation of the measurement tip or the ball takes place when the ball is in contact with a measurement object, since all deformations are absorbed by the supports 2.

It is also possible to arrange separate measuring rods between the measurement tip holder 3 and the base 1. It is in this case appropriate that these measuring rods are designed and arranged in a manner equivalent to that which has been described for the supports in association with the embodiment according to FIG. 5, where these measuring rods would thus pass through the base, and it would be possible to displace them along their longitudinal directions, whereby the measuring rods would comprise a measurement scale such that their positions relative to the base 1 can be determined, and in this way the position of the ball 5 can also be calculated.

Thus a measurement probe according to the invention makes it possible to achieve a very rigid arrangement for the measurement tip and the ball, since deformations are absorbed by other elements, whereby a very accurate determination of the position of the ball can be carried out.

Although the invention has been described here as if the measurement tip is constituted by a physical tip with a ball mounted at the end of it, it is clear that this physical tip can, as has been previously mentioned, be replaced by a virtual tip, where measurements are made against a point that lies at a distance from the measurement tip holder, where this point is fixed relative to the measurement tip holder.

The invention claimed is:

1. A measurement probe for use in coordinate measuring machines, said measurement probe comprises a base (1) connected with a coordinate measuring machine, a measurement tip holder (3) and a measurement tip (4) supported by this holder, characterized in that the measurement tip holder (3) is supported by the base (1) with the aid of at least three rigid supports (2), whereby the supports (2) are connected with the measurement tip holder (3) by means of spherical connections and where the supports (2) can be displaced along their longitudinal directions relative to the base (1) such that the angle of the measurement tip holder (3) relative to the base (1) can be changed, and in that the supports (2) are connected with the base by means of leaf springs (6) that are directed radially outwards from the base (1).

2. The measurement probe according to claim 1, characterized in that driving means (8) are connected with the base (1) in order to interact with the supports (2) for maneuvering of the measuring tip holder (3).

3. The measurement probe according to claim 2, characterized in that the driving means (8) comprises a coil (9) and an element (11) that can be moved within the coil, said element (11) is arranged to influence the outermost end of the leaf springs (6) and in this way the supports (2).

4. The measurement probe according to claim 3, characterized in that the measurement tip (4) comprises a physical measuring tip (4) with a ball (5) arranged in the end of it.

5. The measurement probe according to claim 2, characterized in that the measurement tip (4) comprises a physical measuring tip (4) with a ball (5) arranged in the end of it.

6. The measurement probe according to claim 1, characterized in that the measurement tip (4) comprises a physical measuring tip (4) with a ball (5) arranged in the end of it.

* * * * *